United States Patent
Koch

(10) Patent No.: US 8,336,588 B2
(45) Date of Patent: *Dec. 25, 2012

(54) PATCH AND ELECTRONIC MONITORING DEVICE FOR TIRE

(75) Inventor: Russell W. Koch, Hartville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/400,838

(22) Filed: Mar. 10, 2009

(65) Prior Publication Data

US 2009/0167518 A1 Jul. 2, 2009

Related U.S. Application Data

(60) Continuation of application No. 11/196,138, filed on Aug. 2, 2005, now Pat. No. 7,510,618, which is a continuation of application No. 10/328,582, filed on Dec. 23, 2002, now Pat. No. 6,946,048, which is a division of application No. 09/539,856, filed on Mar. 31, 2000, now Pat. No. 6,688,353.

(51) Int. Cl.
*B60C 5/00* (2006.01)
*B60C 23/00* (2006.01)
(52) U.S. Cl. .................. 152/152.1; 152/450
(58) Field of Classification Search ............ None
See application file for complete search history.

(56) References Cited

U.S. PATENT DOCUMENTS

| | | | |
|---|---|---|---|
| 5,483,827 A | 1/1996 | Kulka et al. | |
| 5,962,778 A | 10/1999 | Billieres | |
| 5,971,046 A | 10/1999 | Koch | |
| 6,208,244 B1 * | 3/2001 | Wilson et al. | 340/447 |
| 6,388,567 B1 * | 5/2002 | Bohm et al. | 340/442 |
| 6,546,982 B1 | 4/2003 | Brown et al. | |
| 6,653,936 B2 * | 11/2003 | Bohm et al. | 340/442 |
| 6,688,353 B1 * | 2/2004 | Koch | 152/152.1 |
| 6,919,799 B2 * | 7/2005 | Wilson et al. | 340/447 |
| 6,946,048 B2 * | 9/2005 | Koch | 156/245 |
| 7,132,930 B2 * | 11/2006 | Wilson et al. | 340/426.33 |
| 7,510,618 B2 * | 3/2009 | Koch | 156/245 |
| 7,592,902 B2 * | 9/2009 | Wilson et al. | 340/426.33 |
| 2002/0075145 A1 | 6/2002 | Hardman et al. | |

FOREIGN PATENT DOCUMENTS

| | | |
|---|---|---|
| JP | 8083876 | 3/1993 |
| JP | 2000351308 | 12/2000 |
| WO | 99/53740 | 10/1999 |
| WO | WO 99/53740 | 10/1999 |

OTHER PUBLICATIONS

Roland Jonasch, Office Action from corresponding Canadian Office Action, Application No. 2,484,779, Jan. 4, 2010, 3 pages, Canadian Intellectual Property Office, Canada.
Japanese Office Action from related application JP 2001-572321.
Canadian Intellectual Property Office; Nov. 10, 2010; Office Action in application 2,484,779; pp. 1 and 2.

* cited by examiner

*Primary Examiner* — Justin Fischer

(57) ABSTRACT

A patch and method for mounting an electronic monitoring device to the innerliner of a pneumatic tire is provided wherein the monitoring device is potted directly to an attachment patch. A frame is built on an attachment patch and the electronic monitoring device is disposed inside the frame. An encapsulation material is poured into the frame and cured to encapsulate the monitoring device directly against the patch. The patch may then be connected to the innerliner of a pneumatic tire.

18 Claims, 4 Drawing Sheets

PATCH AND ELECTRONIC MONITORING DEVICE FOR TIRE

CROSS-REFERENCE TO RELATED APPLICATION

This application is a continuation of U.S. application Ser. No. 11/196,138 filed Aug. 2, 2005, now U.S. Pat. No. 7,510,618 which is a continuation of U.S. application Ser. No. 10/328,582 filed Dec. 23, 2002 now U.S. Pat. No. 6,946,048 which is a division of U.S. application Ser. No. 09/539,856 filed Mar. 31, 2000 now U.S. Pat. No. 6,688,353; the disclosures of which are incorporated herein by reference.

BACKGROUND OF THE INVENTION

1. Technical Field

The present invention generally relates to a patch for mounting an electronic monitoring device to the inside surface of a pneumatic tire. More particularly, the present invention relates to a patch having an electronic monitoring device encapsulated directly to the patch so that it may be mounted to a tire with the patch.

2. Background Information

Monitoring the internal conditions of a pneumatic tire while the tire is in use on a vehicle is becoming increasingly desired in the art. One problem with this technology is protecting the relatively sensitive electronic monitoring device in the relatively harsh environment inside a tire. Another problem in the art is that the inner surface of a tire does not have surfaces where monitoring devices may be easily mounted in a secure manner.

Protecting monitoring devices against harsh tire conditions has been accomplished in the past by encapsulating the monitoring device in an encapsulation or potting material. The potting material is poured over the monitoring device and fills the voids around the elements of the monitoring device. The material hardens and forms a protective block having a high modulus of elasticity around the elements of the monitoring device. The monitoring device is protected in this manner from the flexing and shock forces experienced in a pneumatic tire.

Rubber patches are also known in the art to mount monitoring devices to the inner surface of a tire. The potted monitoring device has been connected to the patch with adhesive and the patch was then adhered to the innerliner of the tire. Other methods of mounting monitoring devices inside tires include forming a pocket in the tire and placing the monitoring device in the pocket. Other methods have placed a rubber patch over the top of the monitoring device to hold the monitoring device against the tire sidewall.

One problem with these mounting solutions is the relatively high number of steps required to mount the monitoring device to the tire. Another problem is the number of times the monitoring device must be handled prior to mounting inside the tire. More importantly, the users of the monitoring devices desire stronger connections between the monitoring device and the tire.

Another problem in the art occurs when the antenna is mounted in a different substraight than the monitoring device. In these situations, a connection must be formed between the monitoring device and the antenna. An example of this situation is shown in patent application Ser. No. 09/301,781 filed Apr. 29, 1999, which is owned by the Assignee of the present application. In this situation, a pair of connectors are used to form the direct physical connection between the antenna and the monitoring device. The problem that has occurred is that the adhesive used to bond the monitoring device to the patch is forced around the connectors sometimes flowing into the connectors. The art desires a solution to this problem by providing a method of connecting the encapsulated monitoring device to a patch while not fouling the connectors.

SUMMARY OF THE INVENTION

In view of the foregoing, the present invention provides a mounted electronic monitoring device ready for mounting to the inside of the tire. The invention solves the problems in the art by directly potting the monitoring device to a rubber attachment patch to form an assembly.

The assembly of the present invention includes a rubber patch having a first surface and a second surface. An electronic monitoring device is positioned adjacent the first surface of the patch with an encapsulation material surrounding at least a portion of the electronic monitoring device. The encapsulation material bonds with the patch to connect the encapsulated monitoring device to the patch.

Another aspect of the invention preferably provides placing the connecting elements used to electrically connect the monitoring device to an antenna embedded within the patch in a location where the connecting elements are surrounded by the encapsulation material.

Another aspect of the invention provides a method for creating the assembly wherein the number of handling steps and fabricating steps are minimized.

The method of the present invention includes the steps of providing a patch having a first surface and a second surface, providing an electronic monitoring device adjacent the first surface of the patch, and encapsulating the electronic monitoring device directly to the first surface of the patch.

An advantage of the invention is that the patch provides a secure mounting platform for the monitoring device that can be readily attached to the innerliner of a pneumatic tire.

Another advantage of the invention is that the connection between the encapsulated monitoring device and the attachment patch does not rely on the strength of an adhesive to connect two separately formed elements.

Another advantage of the invention is that the assembly protects the connections between the antenna and the monitoring device.

Another advantage of the invention is that the connections between the monitoring device and the antenna do not become fouled by adhesive because the antenna and monitoring device are connected before the encapsulation material is poured into the mold.

The foregoing advantages, construction, and operation of the present invention will become more readily apparent from the following description and accompanying drawings.

BRIEF DESCRIPTION OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended Claims.

Similar numbers refer to similar parts throughout the specification.

DESCRIPTION OF THE PREFERRED EMBODIMENTS

Figure 1:
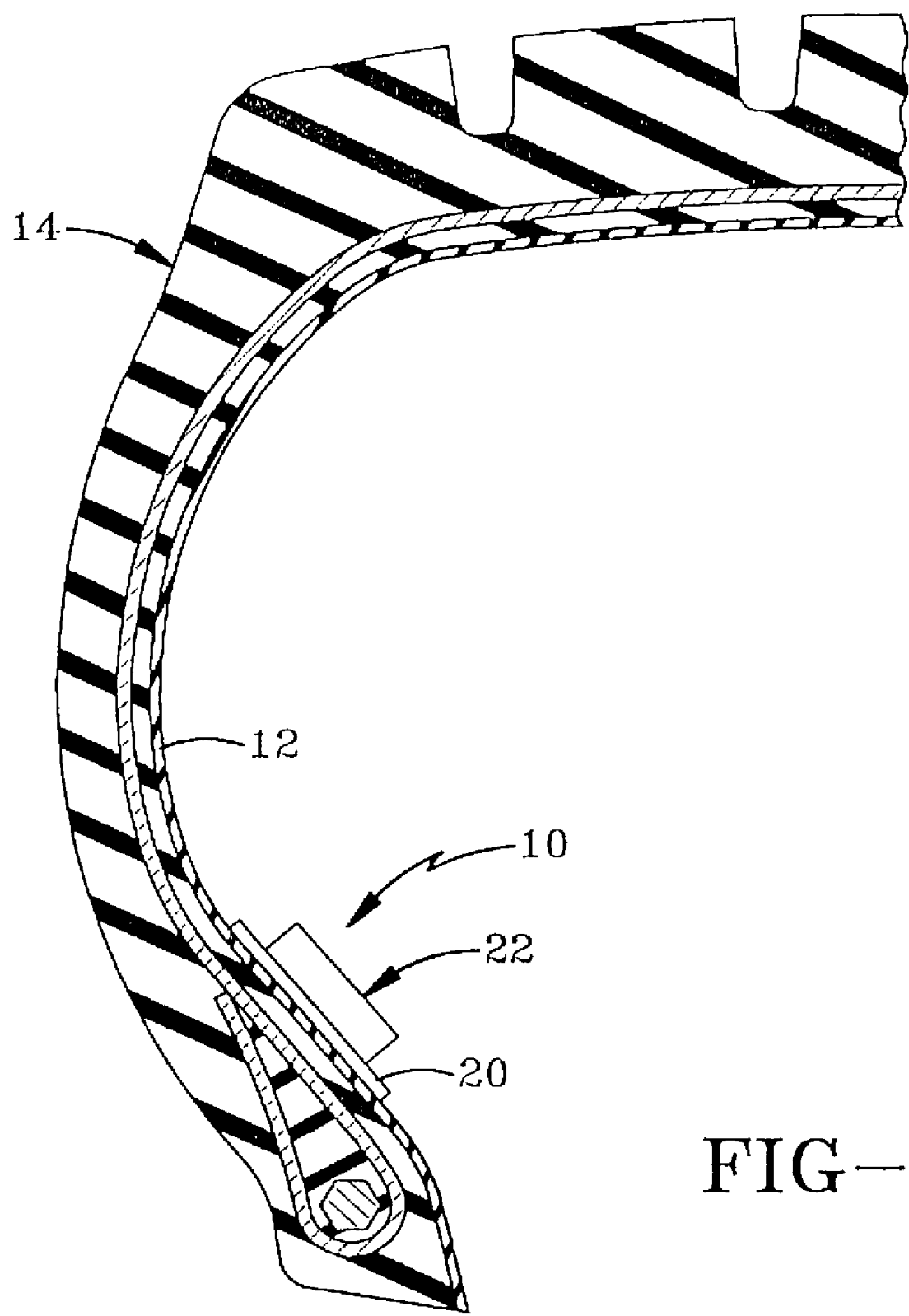
FIG. 1 is a sectional view of a pneumatic tire with an encapsulated monitoring device mounted to the innerliner of the tire with an attachment patch.
Figure 2:
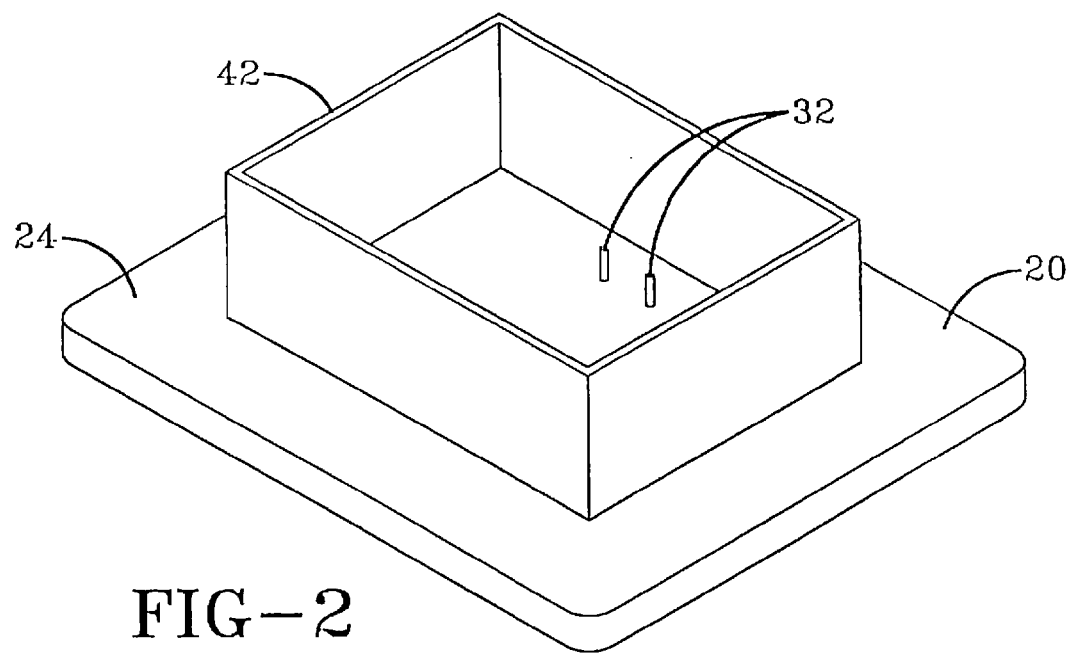
FIG. 2 is a perspective view of the attachment patch with a potting frame assembled and placed on the upper surface of the attachment patch to surround the connectors for the antenna.
Figure 3:
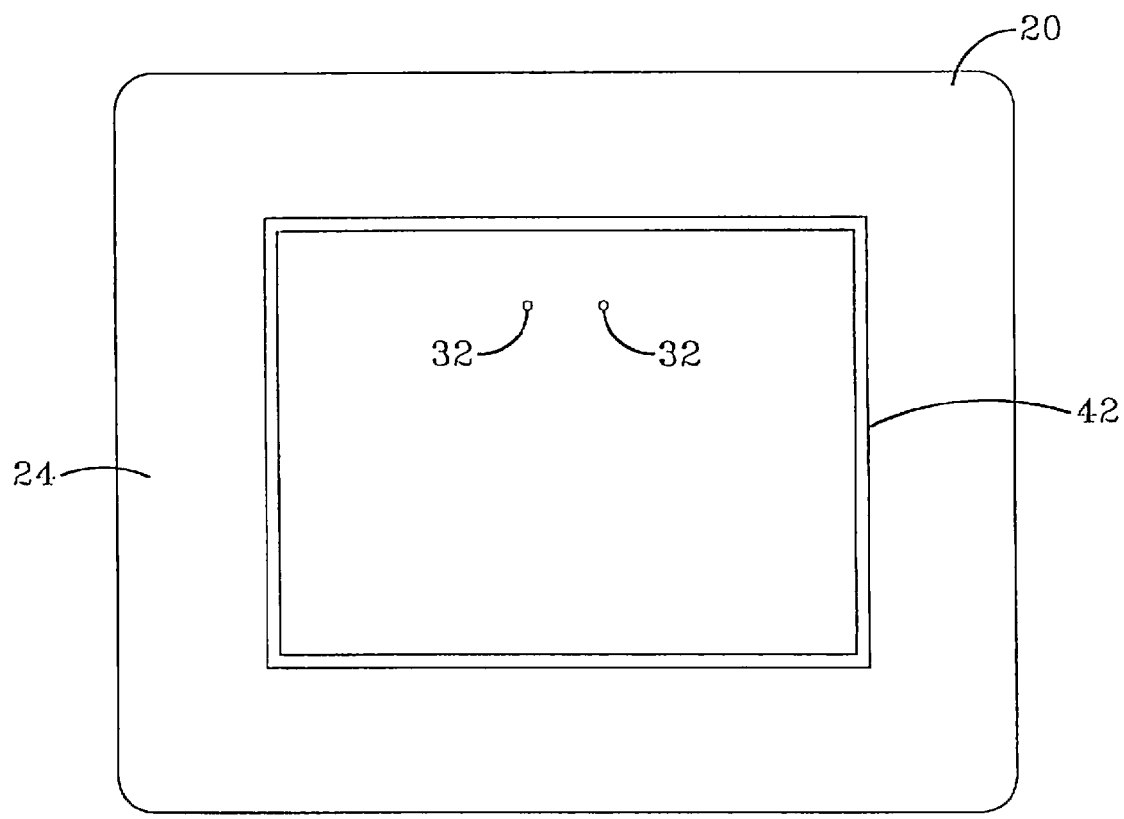
FIG. 3 is a top plan view of FIG. 2.
Figure 4:
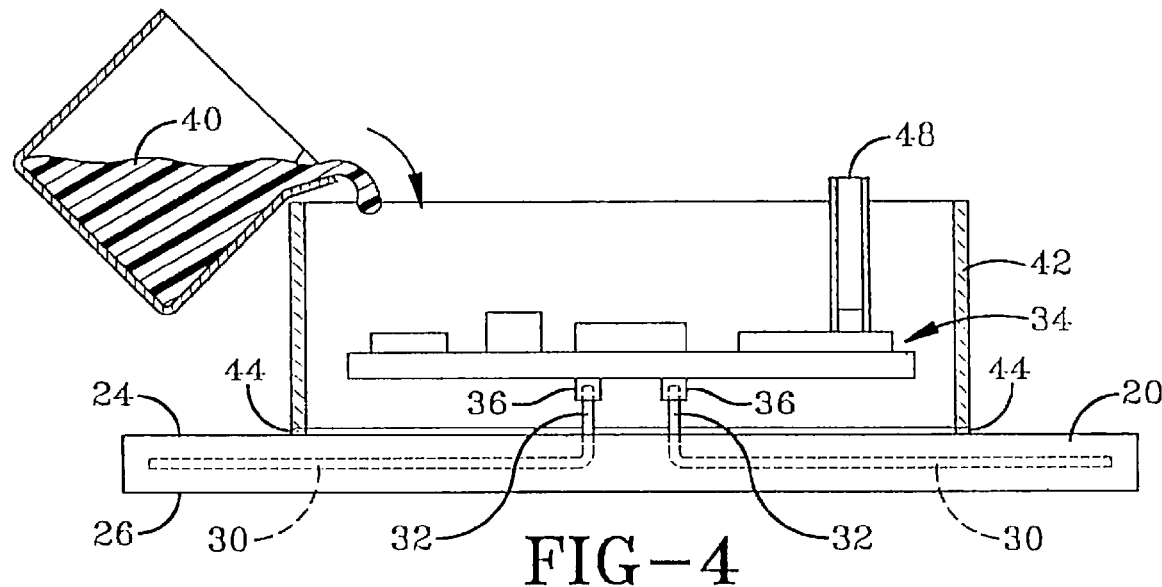
FIG. 4 is a sectional side view of the attachment patch and the potting frame with the electronic monitoring device positioned within the potting frame and the potting material being poured into the potting frame.
Figure 4A:
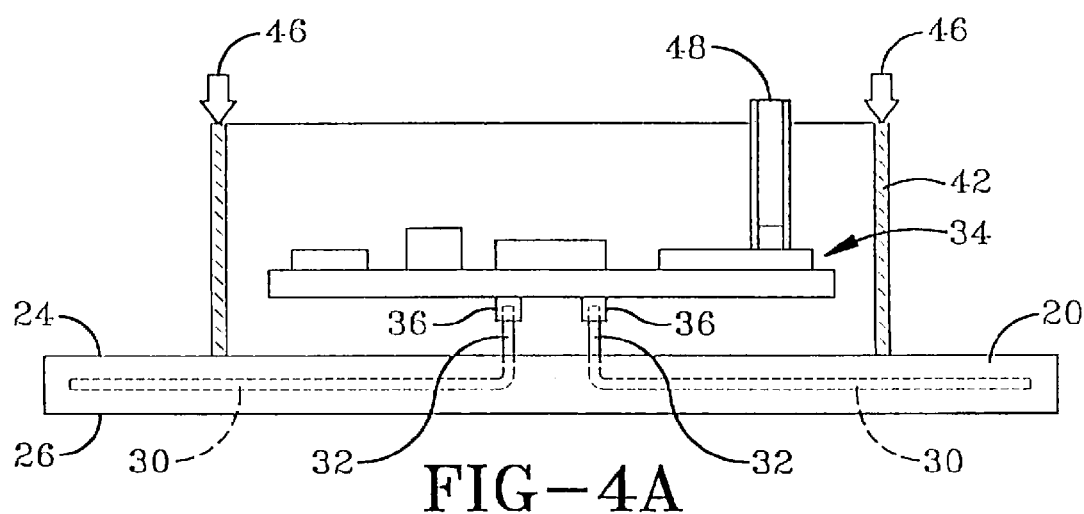
FIG. 4A is a view similar to FIG. 4 showing an alternative embodiment of the invention where the potting frame is held against the attachment patch with pressure.

An assembly used to mount an electronic monitoring device to the inside surface of a pneumatic tire is indicated generally by the numeral 10 in the drawings. Assembly 10 preferably mounts the electronic monitoring device to the innerliner 12 of a pneumatic tire 14 so that the electronic monitoring device may monitor at least one engineering condition of tire 14.

Assembly 10 generally includes an attachment patch 20 and an encapsulated monitoring device 22. Attachment patch 20 is used to connect encapsulated monitoring device 22 to innerliner 12 so that the monitoring device may perform its measurements. Attachment patch 20 includes a first side 24 configured to receive encapsulated monitoring device 22 and a second side 26 configured to attach to tire 14. Attachment patch 20 is preferably fabricated from rubber. The rubber material is preferably vulcanized at a pre-selected temperature and a time sufficient to vulcanize the patch. The patch may be fabricated from a rubber selected from the group consisting of Ethylene Propylene Diene Monomer (EPDM) rubber, butyl rubber, natural rubber, neoprene, and mixtures thereof. One preferred embodiment is a mixture of chlorobutyl rubber and natural rubber. Another preferred embodiment is bromobutyl rubber. Another embodiment is a mixture of Styrene-Butadiene rubber (SBR) natural rubber. Typically, patches made from these rubber compositions may be cured by heating to a temperature of about 150 degrees Celsius and holding this temperature for about thirty minutes. The time and temperature may be modified as necessary to achieve sufficient curing of the patch for further manufacturing steps. The present invention also contemplates that patch 20 may be fabricated from a variety of other rubber mixtures known in the art. In addition to rubbers, patch 20 may be fabricated from other materials that may be adhered to tire 14 and accept encapsulated monitoring device 22 as described below. Thermoplastic Elastomers, Thermoplastic Urethanes or Thermoplastic Olefins may also be used to form attachment patch 20.

In one embodiment of the present invention, patch 20 carries an antenna 30 used to send and receive signals from encapsulating monitoring device 22. Antenna 30 includes connecting elements 32 that protrude outwardly from the outer perimeter of patch 20. Connecting elements 32 may be the male or female portion of a pin and socket-type connector. Connecting elements 32 are used to allow a monitoring package 34 to be plugged into antenna 30 after antenna 30 is cured into to patch 20. Antenna 30 may be connected to patch 20 in a variety of other ways other than being cured into patch 20. For instance, antenna 30 may be mounted on an outer surface of patch 20. Monitoring package 34 may include the various sensors, controllers, memory devices, and power supplies necessary to perform the monitoring, transmitting, and receiving functions desired in the art. Monitoring package 34 must be connected to antenna 30 so that it may communicate with a data gathering device position outside of tire 14. Monitoring package 34 also includes connecting elements 36 that are configured to mate with connecting elements 32 to form a direct electrical connection between monitoring package 34 and antenna 30.

Figure 5:
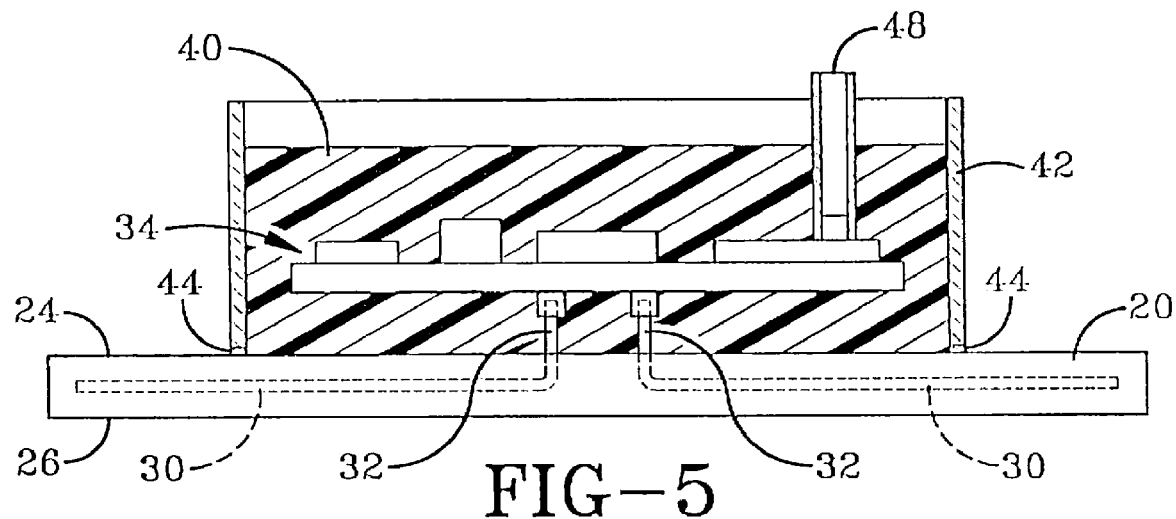
FIG. 5 is a view similar to FIG. 4 showing the potting frame substantially filled with the potting material.

In accordance with one of the objectives of the present invention, monitoring package 34 is encapsulated with an encapsulation material 40 directly to attachment patch 20 such that encapsulation material 40 is chemically and/or physically bonded to attachment patch 20. In one embodiment of the invention, a frame 42 is fabricated and attached to first side 24 of attachment patch 20 by an adhesive 44 by applying adhesive 44 around frame 42 and ensuring a continuous bead of adhesive 44 around the perimeter. In one embodiment, a copper faced board having a thickness of 0.0345 inches is used to fabricate frame 42 by soldering the ends of four pieces together to form frame 42. Another preferred material for forming frame 42 is glass-filled epoxy. In other embodiments, substantially any material may be used for frame 42 that will not interfere with a radio frequency signal if frame 42 remains connected to encapsulated monitoring device 22 as depicted in FIG. 5 and will not melt at the relatively high encapsulation or potting temperature. This temperature is typically 95-125 degrees Celsius.

In another embodiment of the invention, frame 42 is held against first side 24 of attachment patch 20 by applying pressure as indicated by the numeral 46 against frame 42. Pressure 46 maintains the correct position of frame 42 and prevents encapsulation material 40 from leaking out from between frame 42 and attachment patch 20.

Frame 42 is positioned on attachment patch 20 such that connecting elements 32 are disposed within frame 42. The position of connecting elements 32 with respect to frame 42 is referred to as the connection location. It is an important aspect of the present invention to provide strength around the connection location so that the connections between monitoring package 34 and antenna 30 do not become loose with extended use of patch 10.

Depending on the material used to fabricate frame 42, frame 42 may need to be sandblasted and degreased with solvent to clean the surface prior to performing the encapsulation steps of the present invention. For instance, the copper-faced board discussed above is preferably sandblasted and solvent washed to clean the surface. In addition, first side 24 of attachment patch 20 is preferably cleaned and primed with a 3% 1,3,5-Trichloro-s-triazinetrione (Trichloroisocyanuric acid) (TCTT) solutions in butyl actetate. Side 24 was then wiped with a piece of Rymplecloth to remove the excess solvent and surface dirt. Patch 20 was then allowed to dry thoroughly. Adhesive 44 used around frame 42 is preferably FUSOR® 320 (five parts by weight)/310 B (two parts by weight). FUSOR® is available from Lord Corporation. Adhesive 44 is then cured in an oven at 80 degrees Celsius for thirty minutes.

Various other types of adhesives, frame materials, and surface preparations may be used without departing from the scope of the present invention. The specific materials and times described above are merely for the purpose of providing an exemplary embodiment of the invention and the best mode now known for performing the invention.

Monitoring package 34 is then positioned within frame 42 so that it is suspended within frame 42 adjacent first side 24. A chimney 48 may be attached to a sensor (such as a pressure sensor or a temperature sensor) on monitoring package 34 so that it may communicate with the atmosphere surrounding encapsulated monitoring device 22 after encapsulation material 40 is cured. Chimney 48 provides an air passage 50 to monitoring package 34.

Figure 6:
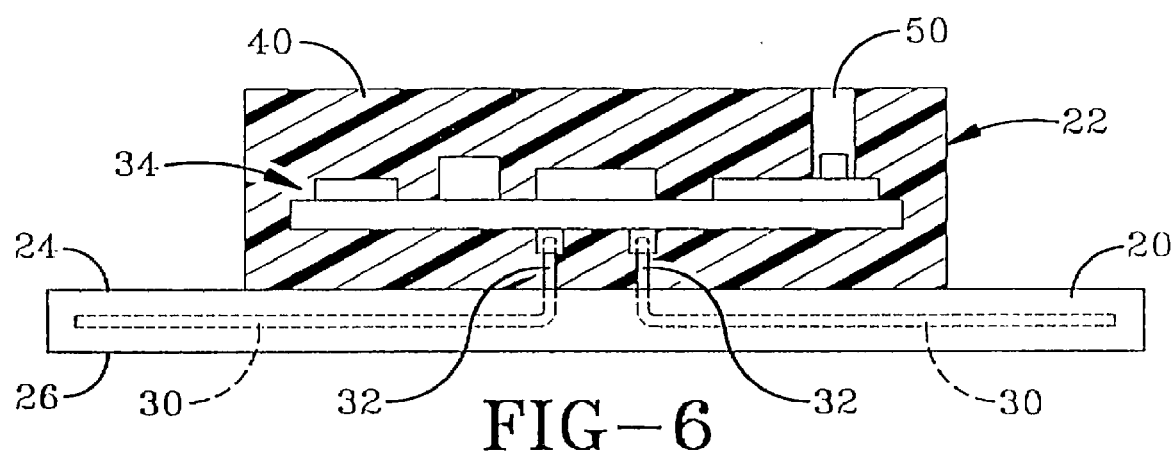
FIG. 6 is a view similar to FIG. 4 showing one embodiment of the final product.

After monitoring package 34 is positioned adjacent first side 24 and within frame 42, encapsulation material 40 is introduced inside frame 42 to substantially surround monitoring package 34 and to fill substantially all voids around monitoring package 34 as depicted in FIG. 5. In the preferred embodiment of the present invention, encapsulation material 40 is a formulation including 100 gm STYCAST® 2651; 7 gm Catalyst 9; and 3 drops defoamer 88. In another embodiment of the invention, encapsulation material 40 is a formulation including 110 gm STYCAST® 2651; 10 gm Phenyl Gycidyl Ether; 9.4 gm Catalyst 9; and 6 drops of defoamer 88. These materials were mixed together at room temperature until thoroughly mixed. The formulation was degassed until foaming subsided. The formulation was then poured into frame 42 and allowed to cure in an oven at 55 degrees Celsius for thirty minutes. It was then post-cured at 80 degrees Celsius for thirty minutes. This process results in a strong encapsulated monitoring device 22 directly bonded to attachment patch 20. Frame 42 may be left in position as depicted in FIG. 5 or removed as depicted in FIG. 6.

Various other encapsulation materials 40 will also function with the present invention. For instance, a variety of epoxies and urethanes that are pourable and cure to a rigid tough material having a high modulus of elasticity may be used. It is desired that encapsulation material 40 having a Young's modulus of at least 30,000 psi and which is capable of being molded around electronic monitoring package 34. Preferably, encapsulation material 40 will have a Young's modulus at least 100,000 psi.

STYCAST®2651 is the preferred encapsulation material. Alternatively, high melting point polyurethanes and/or polyureas may be utilized. The polyurethanes are derived from polysiocyanates which generally have the formula $R(NO)_n$ where n is an integer of 2, 3 or 4 with approximately 2 being preferred. The "n" may, however, vary and often is not an integer because combinations of various polysiocyanates can be utilized. R is an aliphatic having from about 2 to about 20 carbon atoms or preferably an aromatic including an alkyl substituted aromatic having from about 6 to about 20 carbon atoms with from about 6 to about 15 carbon atoms being desired, or combinations thereof. Examples of suitable polysiocyanates include 1,6-diisocyanto hexane; 2,2,4- and/or 2,4,4-trimethylhexamethylene diisocyanate; p- and m-tetramethyl xylene diisocyanate; dicyclohexylmethane-4,4'-diisocyanate (Hydrogenated MDI); 4,4-methylene diphenyl isocyanate (MDI); p- and m-phenylene diisocyanate; 2,4- and/or 2,6-toluene diisocyanate (TDI); durene-1,4-diisocyanate; isophorone diisocyanate and isopropylene bis-(p-phenyl isocyanate). TDI is desirably utilized. The various diphenylmethane diisocyanates (MDI) and mixtures of MDI with polymeric MDI having an average isocyanate functionality of from about 2 to about 3.2 are preferred.

The preparation of the polyurethanes and/or polyureas are well known to the art and to the literature. For example, a short chain oligomer or polymer derived from polyester or polyether polyols generally having a molecular weight of from about 55 to about 1,000 and preferably from about 6 to about 200 are reacted with the above-noted diisocyanates to form a urethane prepolymer. Similarly, a short chain diamine can be utilized and reacted with the above-noted diisocyanates to form a urea prepolymer. Aromatic diisocyanates are generally utilized to yield high melting point urethane or urea prepolymers which also generally have a high modulus of elasticity. The resulting prepolymer is subsequently reacted with diols, diamine, diacids, or amino alcohols, and the like to cure the same and form a polyurethane or polyurea. Alternatively, the polyurethanes and/or polyureas are formed by reacting an existing prepolymer with the above-noted curing or chain extending agents.

The equivalent ratio of isocyanate groups (NCO) reacted with the hydroxyl groups (OH) or amine groups (NH.sub.2) of the short chain compound is generally from about 0.90 to about 1.10, desirably from about 0.95 to about 1.05, and preferably from about 0.98 to about 1.02.

In general, thermoset epoxy resins are preferred. The epoxy resin or polymer is generally formed by the reaction of bisphenol A and epichlorohydrin. The preparation of epoxy resins is well known to the literature and to the art. Generally, epichlorohydrin is reacted with a variety of hydroxy, carboxy, or amino compounds to form monomers with two or more epoxied groups, and these monomers are then used in the reaction with bisphenol A. Examples of such compounds are the diglycidyl derivative of cyclohexane-1,2-dicarboxylic acid, the triglycidyl derivates of p-aminophenol and cyanuric acid, and the polyglycidyl derivative of phenolic prepolymers. Epoxidized diolefins can also be employed. Various co-reactants can be utilized to cure epoxy resins either through the epoxied or hydroxyl groups. Polyamines such as primary or secondary amines are a common curing agent such as aliphatic amines having a total of from about 2 to about 18 carbon atoms and desirably from about 4 to about 8 carbon atoms. Suitable compounds include diethylene triamine, triethylene tetraamine, tetraethylene pentaamine, 4,4'-diaminodiphenylmethane, and polyaminoamides. A combination of diethylene triamine and tetraethylene pentaamine is often desired. Aromatic amines can also be utilized such as those having a total of from 6 to 20 carbon atoms such as meta or paraphenylene diamine and the like. Other curing agents including polythiols, dicyandiamide(cyanoguanidine), diisocyanates, and phenolic prepolymers. Curing of epoxy resins can also be achieved by ring opening polymerization of the epoxied groups using either Lewis acids or Lewis bases.

Accordingly, the improved attachment patch for mounting an electronic monitoring device to the inside of a pneumatic tire apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the attachment patch for mounting an electronic monitoring device to the inside of a pneumatic tire is constructed and used, the characteristics of the construction, and the advantageous new and useful results obtained; the new and useful structures, devices, elements, arrangements, parts, and combinations are set forth in the appended claims.

The invention claimed is:
1. A vehicle tire comprising:
a tire body having an innerliner defining an inside surface;
an attachment patch for mounting a monitoring device to the inside of the tire body; the attachment patch fabri- cated from a material; the attachment patch having at least a first surface and a second surface;
an antenna carried by the attachment patch; the antenna including a connecting element that protrudes outwardly from the attachment patch;
an electronic monitoring package being spaced from the first surface of the attachment patch; the electronic monitoring package being connected to the antenna with the connecting element at a connection location;
an encapsulation material surrounding at least a portion of the electronic monitoring device;
the encapsulation material surrounding the connection location;
the encapsulation material encircling the location where the connecting element protrudes outwardly from the attachment patch;
at least a portion of the encapsulation material being disposed between the first surface of the attachment patch and the monitoring package;
the encapsulation material being integrally bonded to the material of the attachment patch to define an integral combination, the encapsulation material having been directly applied and then cured to the first side of the attachment patch so as to directly and securely bond with the material of the attachment patch to connect the encapsulation material and the electronic monitoring device to the material of the attachment patch; and
the second surface of the attachment patch being connected to the innerliner.

2. The tire of claim 1, wherein a portion of the antenna is embedded within the attachment patch.

3. The tire of claim 1, wherein the encapsulation material defines an open passage extending to a portion of the monitoring package.

4. The tire of claim 1, wherein the material of the attachment patch is vulcanized rubber.

5. A vehicle tire comprising:
a tire body having an innerliner defining an inside surface;
an attachment patch for mounting a monitoring device to the inside of the tire body; the attachment patch fabricated from a material; the attachment patch having at least a first surface and a second surface;
an antenna carried by the attachment patch;
an electronic monitoring package being spaced from the first surface of the attachment patch; the electronic monitoring package being connected to the antenna at a connection location;
an encapsulation material surrounding at least a portion of the electronic monitoring device;
the encapsulation material surrounding the connection location;
at least a portion of the encapsulation material being disposed between the first surface of the attachment patch and the monitoring package;
the encapsulation material having been directly applied and then cured to the first side of the attachment patch so as to directly and securely bond with the material of the attachment patch to connect the encapsulation material and the electronic monitoring device to the material of the attachment patch;
the second surface of the attachment patch being connected to the inside surface of the pneumatic tire; and
a frame connected to the first surface of the attachment patch; the encapsulation material and monitoring package being surrounded by the frame.

6. The tire of claim 5, wherein the frame is connected to the attachment patch with an adhesive.

7. The tire of claim 5, wherein the frame is made from metal-faced board.

8. The tire of claim 5, wherein the frame is made from a glass-filled epoxy.

9. An electronic monitoring device and patch combination adapted to be connected to and to monitor an engineering condition of a pneumatic article; the combination comprising:
an attachment patch for mounting to the pneumatic article; the attachment patch fabricated from a material; the attachment patch having at least a first surface and a second surface;
an antenna carried by the attachment patch; the antenna including a connecting element that protrudes outwardly from the attachment patch;
an electronic monitoring package being spaced from the first surface of the attachment patch; the electronic monitoring package being connected to the antenna with the connecting element at a connection location;
an encapsulation material surrounding at least a portion of the electronic monitoring device;
the encapsulation material surrounding the connection location;
the encapsulation material encircling the location where the connecting element protrudes outwardly from the attachment patch;
at least a portion of the encapsulation material being disposed between the first surface of the attachment patch and the monitoring package; and
the encapsulation material being integrally bonded to the material of the attachment patch to define an integral combination, the encapsulation material having been directly applied and then cured to the first side of the attachment patch so as to directly and securely bond with the material of the attachment patch to connect the encapsulation material and the electronic monitoring device to the material of the attachment patch.

10. The combination of claim 9, wherein a portion of the antenna is embedded within the attachment patch.

11. The combination of claim 9, wherein the encapsulation material defines an open passage extending to a portion of the monitoring package.

12. The combination of claim 9, wherein the material of the attachment patch is vulcanized rubber.

13. An electronic monitoring device and patch combination adapted to be connected to and to monitor an engineering condition of a pneumatic article; the combination comprising:
an attachment patch for mounting to the pneumatic article; the attachment patch fabricated from a material; the attachment patch having at least a first surface and a second surface;
an antenna carried by the attachment patch;
an electronic monitoring package being spaced from the first surface of the attachment patch; the electronic monitoring package being connected to the antenna at a connection location;
an encapsulation material surrounding at least a portion of the electronic monitoring device;
the encapsulation material surrounding the connection location;
at least a portion of the encapsulation material being disposed between the first surface of the attachment patch and the monitoring package;
the encapsulation material having been directly applied and then cured to the first side of the attachment patch so as to directly and securely bond with the material of the attachment patch to connect the encapsulation material and the electronic monitoring device to the material of the attachment patch; and a frame connected to the first surface of the attachment patch; the encapsulation material and monitoring package being surrounded by the frame.

14. The combination of claim 13, wherein the frame is connected to the attachment patch with an adhesive.

15. The combination of claim 13, wherein the frame is made from metal-faced board.

16. The combination of claim 13, wherein the frame is made from a glass-filled epoxy.

17. A method of forming an assembly of an attachment patch and electronic monitoring device for monitoring an engineering condition of a pneumatic article; the method comprising the steps of:

(a) providing a flexible attachment patch having a first surface and a second surface; the second surface of the flexible attachment patch being adapted to be bonded to the pneumatic article; the flexible attachment patch carrying an antenna with an antenna connector extending from the first side of the attachment patch;

(b) supporting a monitoring package from the antenna connector in a location spaced from the first surface of the attachment patch; and (c) after step (b), encapsulating the monitoring device and the antenna connector with an encapsulation material to secure the monitoring package and encapsulation material to the first surface of the attachment patch.

18. The method of claim 17, further comprising the step of forming an air passage that extends to the monitoring package.

* * * * *